June 14, 1938. D. H. HILL 2,120,669
VALVE FOR OIL BURNERS
Filed July 24, 1936
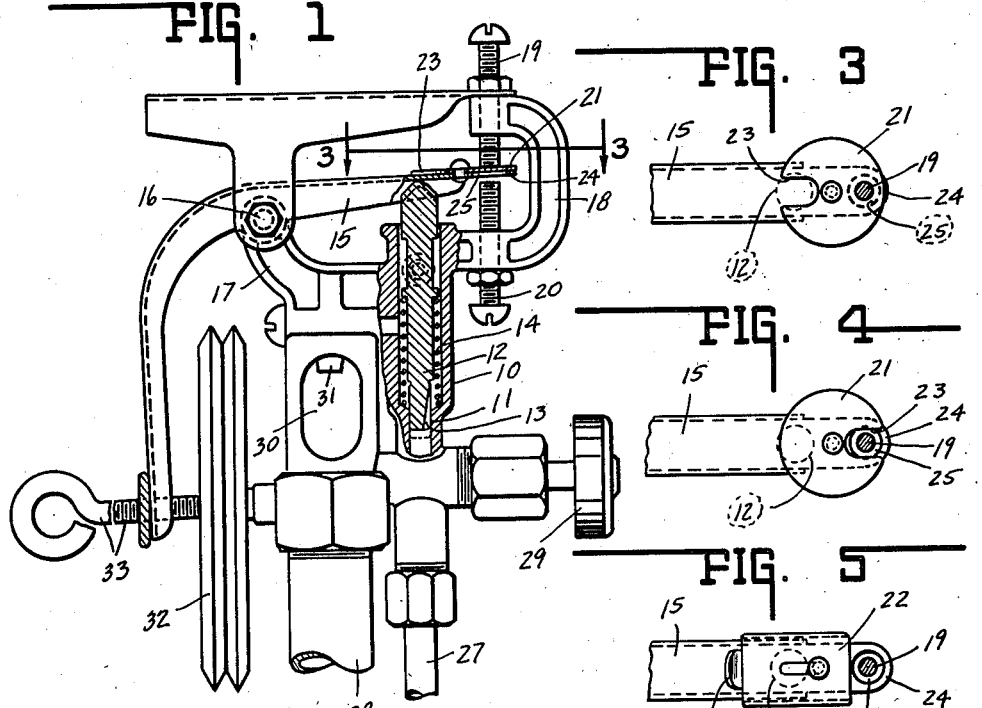
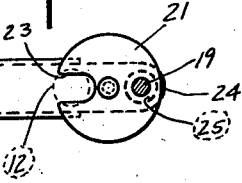
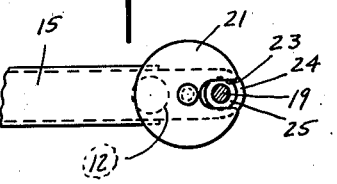
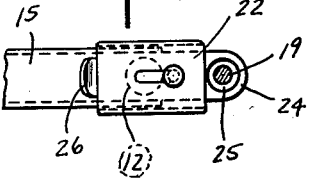
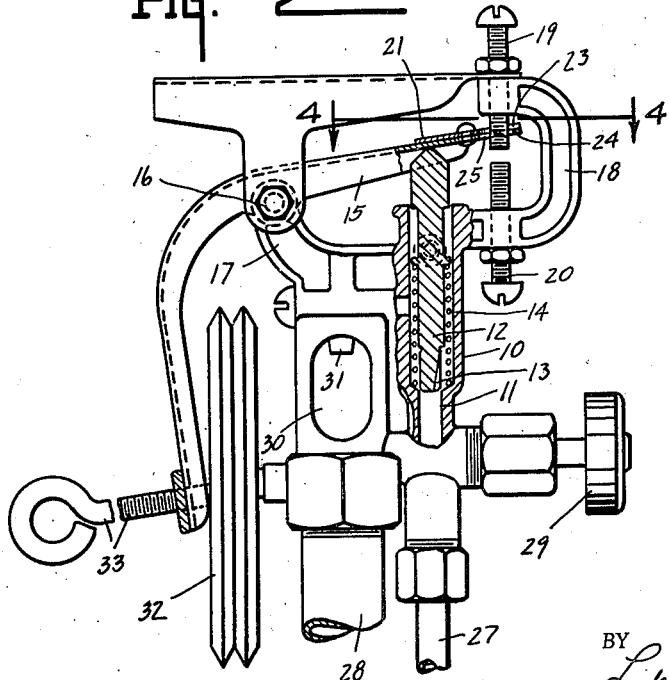
INVENTOR.
DEWEY H. HILL.
BY
*Lockwood Goldsmith & Galt*
ATTORNEYS.

UNITED STATES PATENT OFFICE 2,120,669

VALVE FOR OIL BURNERS

Dewey H. Hill, Macomb, Ill., assignor to Globe American Corporation, Kokomo, Ind., a corporation Application July 24, 1936, Serial No. 92,277

3 Claims. (Cl. 251—152)

This invention relates to a thermostatically controlled oil valve of the type usually employed in connection with oil burners for brooder stoves and the like.

In connection with such oil burners, it is desirable that the open position of the metering pin in the valve be limited by a maximum limit screw, preferably pre-set at the factory or point of service, to permit only sufficient fuel to pass through the valve to meet the maximum requirements of the stove. The maximum limit setting is important in this type of thermostatic valve to prevent too high a rate of combustion in the burner which would result in overheating of the drum and possibly fire damage, in event the user did not have the thermostatic wafer adjustment properly set. Furthermore, the proper setting of the maximum limit screw acts as a safety factor in case of failure of the thermostatic wafer.

It is the object of this invention to provide a valve wherein the maximum limit screw may be preset and need not be thereafter disturbed, but wherein the user may temporarily open wide the metering pin or needle valve to permit escape of air in the fuel line when the fuel tank is filled with oil. This arrangement also permits for convenient manipulation in flushing the valve to remove particles of dirt or the like without disturbing the continued operation of the burner.

With the pre-setting of the metering pin, through the medium of the maximum limit screw, there is only a very small opening in the valve for normal operation. In this position, when fuel is placed in the tank, the air in the fuel line cannot escape as rapidly as the fuel feeds which results in an air lock that is difficult to break up. By means of this invention, the valve can be opened wide without affecting the setting of the maximum limit screw to permit free passage of air and avoid this difficulty. Likewise, the valve may be opened wide temporarily without affecting the maximum limit screw to permit the flushing of the valve seat at any time when the brooder is in operation. This is of advantage since dirt will collect in the valve or metering pin groove which otherwise would necessitate the disturbing of the maximum limit screw setting or moving parts in order that it may be cleaned.

The principal feature of the invention for accomplishing the above purposes and advantages resides in the provision of a movable member, plate or disc mounted upon the control lever and extending between the maximum and minimum limit screws when set for normal operation, but which may be conveniently moved to non-operating position, whereby it will be free from engagement with said screws so that the lever may be moved to permit maximum opening of the valve for initial air passage or flushing.

Other objects and features of the invention will be understood from the accompanying drawing and the following description and claims:

Fig. 1 is a side elevation of a thermostatically controlled valve with portions thereof shown in central vertical section and in normal operating position. Fig. 2 is the same as Fig. 1 showing the valve in full open position. Fig. 3 is a plan view of the lever release member taken on the line 3—3 of Fig. 1. Fig. 4 is the same as Fig. 3 showing said member taken on the line 4—4 of Fig. 2. Fig. 5 is a modified form of said member showing it in released position.

In the drawing, there is illustrated an oil valve comprising a valve housing 10 provided with a throat 11 in which a valve such as a metering pin 12 is adapted to operate, said pin being provided with the usual V-shaped tapered slot 13 in the lower or metering end thereof of such character that as the pin is lowered into the throat 11 or valve seat, the passage through the slot is decreased, and, when elevated away from the throat or seat of the valve housing, it is increased.

The metering pin is normally urged to elevated or open position by the spring 14 surrounding said pin and having one end bearing against a shoulder thereon and the other end upon the throat or seat of the valve housing 10. The upper end of the pin engages a control lever 15 which is pivoted at 16 upon an arm 17 extending from the valve housing. Extending from the valve housing on the opposite side there is a U-shaped bracket 18 adapted to receive in the upper arm thereof a maximum limit screw 19. In alignment with said screw there is a minimum limit screw 20 adjustably extending through the lower arm of the bracket. Said minimum and maximum limit screws are adapted to be pre-set at the factory or source of service for limiting the movement of the control lever 15, their setting providing for a predetermined space between their adjacent and aligned ends.

For limiting the movement of the lever 15 by the limit screws, said lever is provided with an extension in the form of a movable member, such as a pivoted and rotatable disc 21 as illustrated in Figs. 3 and 4, or a sliding plate 22 as illustrated in the modified form of Fig. 5. The disc 21 is provided with a peripheral notch 23 adapted to be moved upon rotation of the disc into alignment with the limit screws. The extended end 24 of the lever 15 is provided with an enlarged opening 25 which freely clears the pin so as not to be engaged thereby. For convenience of manipulation, the periphery of the disc 21 may be knurled, whereas the sliding plate 22 is provided with a thumb piece 26.

The valve is provided in the usual manner with an intake fuel line 27 leading from a suitable fuel tank, not illustrated herein. The outlet fuel line 28 leads to the oil burner of the usual character, not illustrated. The valve is provided with a shutoff valve handle 29 and with a sight feed 30 for observing the dropping or flow of oil from the nozzle 31. Mounted on one side of the valve there is a thermostatic wafer 32 of the usual character adapted to be engaged by a thermostatic adjusting screw 33 which operates through the opposite end of the lever 15 from the disc 21.

In operation, when the fuel tank is to be initially filled and the limit screws have been pre-set, the valve 29 is opened and the knurled disc 21 is turned until the notch 23 is in alignment with the screw 19. This permits the lever 15 to move upwardly to its maximum elevated position, as illustrated in Fig. 2, by either pressing in on the wafer 32 with the finger or screwing the thermostatic screw away therefrom to the position shown in Fig. 2. This position of the lever 15 permits the needle valve or metering pin 12 to be moved to its maximum open position by the spring 14, as illustrated in Fig. 2. The fuel may then be poured into the fuel tank, the air escaping through the lines 27, 28 past the wide open valve. After all air has been driven from the line, the fuel will flow through the sight feed in a steady stream, or at least with only an occasional break. The valve lever may be left in this position until fuel begins to flow into the burner, whereupon the lever should then be manually moved downwardly against the tension of the spring 14 until the disc 21 may be turned for engagement between the ends of the limit screws 19, 20, from the position shown in Fig. 4 to the position shown in Fig. 3. The thermostatic valve 33 may, thereupon, be adjusted to obtain the desired operation in the usual manner.

The same procedure may be followed for flushing the valve to remove any accumulation of dirt or the like wherein the disc 21 and the thermostatic control are moved temporarily to a position for permitting full opening of the valve without disturbing the position of the limit screws.

The invention claimed is:

1. A control valve for liquid fuel burners including a tubular housing provided with a valve seat, a spring actuated valve member slidably mounted in said housing for controlling the passage of fuel therethrough, said spring urging said member to full open position, a lever pivotally mounted upon said housing for moving said member toward said seat against the tension of said spring, means for restricting the movement of said lever within narrow limits for maintaining said valve member in normal operating position, and a sliding plate operable for rendering said restricting means ineffective to temporarily permit said valve member to move to full open position.

2. A control valve for liquid fuel burners including a tubular housing provided with a valve seat, a spring actuated valve member slidably mounted in said housing for controlling the passage of fuel therethrough, said spring urging said member to full open position, a lever pivotally mounted upon said housing for moving said member toward said seat against the tension of said spring, an adjustable screw on said lever for controlling its normal range of movement, means for restricting the movement of said lever between narrow limits for maintaining said valve member in normal operating position, and manually operable means on said lever for rendering said restricting means ineffective to temporarily permit said valve member to move to full open position.

3. A control valve for liquid fuel burners including a tubular housing provided with a valve seat, a spring actuated valve member slidably mounted in said housing for controlling the passage of fuel therethrough, said spring urging said member to full open position, a lever pivotally mounted upon said housing for moving said member toward said seat against the tension of said spring, an adjustable screw on said lever for controlling its normal range of movement, oppositely disposed and aligned limit screws for restricting the movement of said lever for maintaining said valve member in normal operating position within narrow limits, and manually operable means on said lever for rendering said limit screws ineffective without altering the position thereof to temporarily permit said valve member to move to full open position.

DEWEY H. HILL.